Patented Dec. 19, 1922.

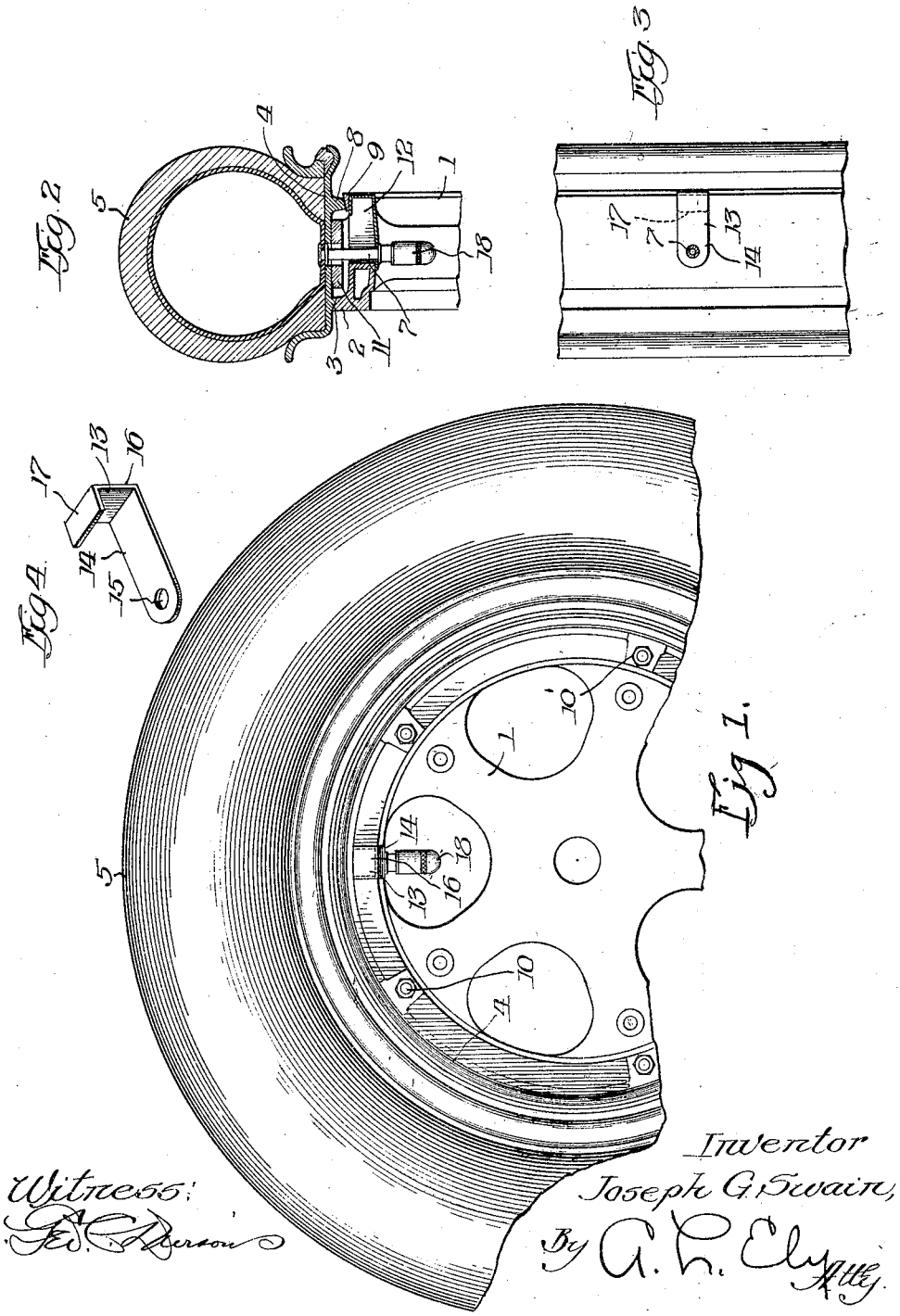

1,439,037

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

WHEEL AND DEMOUNTABLE RIM.

Application filed April 19, 1919. Serial No. 291,192.

*To all whom it may concern:*

Be it known that I, JOSEPH G. SWAIN, a citizen of the United States, residing at Akron, in the county of Summit, State of Ohio, have invented certain new and useful Improvements in Wheels and Demountable Rims, of which the following is a specification.

This invention relates to demountable rims for carrying pneumatic tires and the purpose is to perfect the mounting of the wheel so as to reduce as much as possible the lifting required in mounting and demounting the tire. Particularly in the use of large size pneumatic tires, an objectionable feature arises in the ordinary construction of rims and wheels, as an excessive amount of space is necessary to permit the valve stem to be withdrawn as the rim is rocked off the wheel. It is the purpose of this invention to so construct the wheel that the rim may be slid onto the wheel without providing a large space between the wheel and the rim, and obviating the necessity of lifting the heavy rim and tire. For this purpose, there has been substituted for the regular valve stem hole, a slot, preferably entering from the side of the wheel, through which the valve stem can be passed without the necessity of lifting, tipping, or rocking the rim as in the ordinary construction. I have also provided means for covering the slot so that dirt and water will be excluded from the slot and mud will not become caked therein.

These and other objections will be apparent as the description proceeds and it is understood that modifications may be made in the form of invention without sacrificing any of its benefits.

In the drawings:

Fig. 1 is a side elevation of a portion of the wheel.

Fig. 2 is a cross section through the valve stem.

Fig. 3 is a plan view of the inside of the wheel at the valve stem.

Fig. 4 is a perspective view of the clip or cover plate.

The invention herein may be embodied in many different forms, one of which is shown in the drawings in which 1 represents a wheel structure. This wheel may be of any preferred type, that shown being a cast steel wheel of any well known type, the outer surface of which is formed as a cylinder, except for a flange or rib 2, the upper surface of which is formed as a cone to provide a seat for a corresponding conical rib 3 on the underside of the demountable or removable rim 4. This rim may be of any desirable form, that shown being of the type known as a straight-side quick detachable rim adaptable to receive a straight-side tire 5. The form of the rim is immaterial as it may be made to receive any well known type of tire. The inner tube of the tire is shown at 6 and the valve stem of any well known construction at 7.

On the outer side of the rim is formed an inwardly extending rib 8, the underside of which is beveled and closely adjacent the outer surface of the wheel, a locking ring 9, triangular in cross section being inserted between the rib and the surface of the wheel to hold the rim in position. A series of clamps 10 are mounted on the wheel and serve to force the locking ring in position and hold it. On the underside of the rim may be formed a driving lug 11 as is well understood in the art.

The mounting for the rim just described is a well known form, but my invention is not limited for use with this particular mounting and may be adapted for use with any form of securing means.

In order to provide for removal of the rim and tire by lateral sliding action to avoid the lifting or tilting of the rim, with its consequent disadvantages, it is desirable to afford means for permitting the tire valve to pass out at the side of the wheel. This means comprises preferably a slot or elongated recess 12, which will allow a lateral movement of the rim on the wheel sufficient to permit the removal of the rim without the excessive tilting or rocking found in the present forms of demountable rims.

The slot 12 is shown as opening from the side of the wheel which will permit the lateral movement of the rim without excessive tilting, and, while this construction is preferred, the invention herein is not so limited.

In order to keep the slot free from caked mud or dirt, and to protect the inside of the rim and valve stem and tire from water, dust, or mud, there is provided a cover plate or clip which may be of any preferred form. In the present form of the invention the clip is shown at 13 and comprises an approximately flat major portion 14, the end of which is provided with an aperture 15 which passes over the valve stem. A side flange 16 may be formed on the end of the clip which may be seated in a recess in the side of the wheel so as to come flush with the main body. The end of the clip is turned backward as at 17 to parallel the main portion and may be received in a recess in the outer surface of the wheel.

The dust cap is shown at 18, and, when screwed down onto the valve stem, contacts the upper surface of the cover plate. It will be seen that the clip or cover plate is held in place by the valve stem and dust cap, and further by the under side of the clamping ring.

Although the invention has been described in more detail than is necessary for an understanding of it, I am not limited to the exact form or proportions and location of parts, but may modify the invention in a number of ways without departing therefrom.

I claim:

1. In a demountable rim construction, a wheel and demountable rim, the wheel being provided with a slot opening from the side thereof, to receive the valve stem and permit the removal of the rim without tipping, an angular plate having two parallel portions and a third portion connecting the parallel portions fitted over the slot and covering it from three sides, in combination with means on the valve stem adapted to contact the plate and hold it in place.

2. In a demountable rim construction, a wheel and demountable rim, a clamping ring between the wheel and the rim, the wheel being provided with a slot opening from the side thereof to receive the valve stem and permit the removal of the rim without tipping, a plate, one arm of said plate covering the upper surface of the slot and provided with an aperture to receive the valve stem, a second arm covering the side of the wheel at the slot and a third arm parallel to the first named arm receivable under the clamping ring.

3. In a demountable rim construction, a wheel and demountable rim, a clamping ring between the wheel and the rim, the wheel being provided with a slot opening from the side thereof to receive the valve stem and permit the removal of the rim without tipping, a plate, one arm of said plate covering the upper surface of the slot and provided with an aperture to receive the valve stem, a second arm covering the side of the wheel at the slot and a third arm parallel to the first named arm receivable under the clamping ring in combination with a dust cap screwed onto said valve stem and securing the plate in position.

4. A wheel having a fixed rim with a slot formed therein which extends inwardly from a side thereof, a demountable rim adapted to accommodate a tire with a valve stem thereon, a wedge ring for holding the rim to the fixed rim, a cover co-operating with the inner side and the outer side of the fixed rim and covering the said slot, said cover having an opening through which a valve stem may extend and also provided with a portion adapted to extend between a surface of the fixed rim and the wedge ring.

JOSEPH G. SWAIN.